United States Patent [19]
Wang et al.

[11] Patent Number: 5,998,525
[45] Date of Patent: Dec. 7, 1999

[54] COATING AND COMPOSITION FOR TRANSPORTATION AND SIGN SURFACES AND METHOD OF PREPARING AND APPLYING SAME

[75] Inventors: Hugh H. Wang, Gastonia, N.C.; Bo H. Gimvang, St. Augustine, Fla.

[73] Assignee: FMC Corporation, Philadelphia, Pa.

[21] Appl. No.: 08/980,843

[22] Filed: Dec. 1, 1997
(Under 37 CFR 1.47)

Related U.S. Application Data

[60] Provisional application No. 60/032,184, Dec. 2, 1996.
[51] Int. Cl.$^6$ .............................. C08K 3/26; C08K 5/04
[52] U.S. Cl. ...................... 524/425; 428/452; 428/446; 524/399; 524/400; 524/413; 524/442; 524/494
[58] Field of Search ................................. 428/452, 446; 524/399, 400, 413, 425, 442, 494

[56] References Cited

U.S. PATENT DOCUMENTS

| | | |
|---|---|---|
| 3,920,578 | 11/1975 | Yates . |
| 3,961,968 | 6/1976 | Wales . |
| 3,977,888 | 8/1976 | Sano et al. . |
| 3,986,996 | 10/1976 | Villa et al. . |
| 4,041,000 | 8/1977 | Farcnik . |
| 4,137,087 | 1/1979 | Blasko et al. . |
| 4,140,535 | 2/1979 | Boberski et al. . |
| 4,146,509 | 3/1979 | Markusch et al. . |
| 4,162,169 | 7/1979 | Schutt . |
| 4,169,735 | 10/1979 | Boberski et al. . |
| 4,267,089 | 5/1981 | Brown . |
| 4,288,252 | 9/1981 | Neely . |
| 4,355,118 | 10/1982 | Iliopulos et al. . |
| 4,464,486 | 8/1984 | Kramer et al. . |
| 4,749,731 | 6/1988 | Kyminas et al. . |
| 5,057,576 | 10/1991 | Spinelli . |
| 5,063,254 | 11/1991 | Nakos . |
| 5,124,381 | 6/1992 | Ward . |
| 5,164,003 | 11/1992 | Bosco et al. . |
| 5,186,743 | 2/1993 | Flasch . |
| 5,223,030 | 6/1993 | Valette et al. . |
| 5,466,280 | 11/1995 | Lee et al. . |
| 5,560,773 | 10/1996 | Gimvang . |

FOREIGN PATENT DOCUMENTS

| | | |
|---|---|---|
| 42 44 665 | of 0000 | Germany . |
| 2 255 099 | of 0000 | United Kingdom . |
| 948259 | of 0000 | United Kingdom . |

OTHER PUBLICATIONS

Novel Inorganic/Organic Coatings Based on Linseed Oil and Sunflower Oil with Sol–Gel Precursors, S. J. Tuman et al., Journal of Coatings Technology, Mar. 1996.

Solidification of Colloidal Crystals of Silica, H. B. Sunkara et al., Hybrid Organic–Inorganic Composites, Chapter 14, American Chemical Society, Symposium Series 585, Mar. 1994, pp. 179–191.

Organic–Inorganic Hybrids with a Crystalline Polymer Matrix, J. Burdon et al., Hybrid Organic–Inorganic Composites, Chapter 2, American Chemical Society, Symposium Series 585, Mar. 1994, pp. 6–17.

Hybrid Organic–Inorganic Materials, The Sol–Gel Approach, J. D. Mackenzie, Hybrid Organic–Inorganic Composites, Chapter 17, American Chemical Society, Symposium Series 585, 1994, pp. 226–236.

Hybrid Organic–Inorganic Silica Materials, Chemical Evidence for Organization in the Solid, G. Cerveau et al., Hybrid Organic–Inorganic Composites, Chapter 16, American Chemical Society, Symposium Series 585, 1994, pp. 210–225.

Inorganic–Organic Hybid Coatings for Metal and Glass Surfaces, H. Schmidt et al., Hybrid Organic–Inorganic Composites, Chapter 26, American Chemical Society, Symposium Series 585, 1994, pp. 331–347.

International Search Report for PCT/US 97/21984, filed Dec. 1, 1997, mailed Apr. 9, 1998, Y. Girard.

*Primary Examiner*—Kriellion Sanders
*Attorney, Agent, or Firm*—Alston & Bird LLP

[57] ABSTRACT

The present invention includes a coating composition which can be used for transportation and sign surfaces. The coating composition comprises a mixture of a binder capable of being polymerized and crosslinked and comprising an organic material and an inorganic material, a visibility enhancement filler, a retroreflectivity enhancement filler, and a moisture proofing and water repellent material. The coating composition can further include various additives. The present invention also includes methods of preparing the coating composition and methods of producing a coated substrate using the coating composition of the invention.

23 Claims, No Drawings

5,998,525

COATING AND COMPOSITION FOR TRANSPORTATION AND SIGN SURFACES AND METHOD OF PREPARING AND APPLYING SAME

CROSS REFERENCE TO RELATED APPLICATIONS

This application is related to commonly owned provisional application Ser. No. 60/032,184, filed Dec. 2, 1996, and claims the benefit of the earlier filing date of this application under 35 U.S.C. §119(e).

FIELD OF THE INVENTION

The present invention is directed to coating compositions and particularly to hybrid inorganic- organic coating compositions for transportation and sign surfaces.

BACKGROUND OF THE INVENTION

Transportation surfaces such as roads, runways, bridges and sign surfaces are generally marked using colored coatings such as paints. For example, roads, runways and bridges generally include lane markings, pedestrian crossings, directional markings and other markings which help to control the flow of traffic. Signs also include markings such as safety markings to provide information to the vehicle operator. Because these markings help to maintain order on roads, runways and other transportation surfaces, these markings should be highly visible to the driver under different weather conditions.

Heretofore, markings for transportation and sign surfaces have been produced using solvent-based organic binders. However, solvent-based organic coating materials are associated with the release of volatile organic compound (VOC) into the atmosphere. VOC is environmentally objectionable and is considered one of the major causes of the breakdown of the protective ozone layer of the earth.

Another problem with organic-based coatings is that these coatings tend to deteriorate during normal use. Specifically, the organic-based coatings degrade under ultraviolet light which greatly shortens the service life of the markings.

One alternative to solvent-based organic binders are coating compositions which use thermoplastic binders. Thermoplastic binders are not solvent-based materials and thus do not release VOC. Therefore, thermoplastic binders share a large portion of the market for transportation marking paints. Nevertheless, the application of paints having thermoplastic binders is rather difficult because it requires heating and spreading the paints during application of the paints. Furthermore, it is hard to clean painting machinery and equipment which has been used with paints containing thermoplastic binders. Moreover, the range of thicknesses for which these paints can be applied is limited.

One alternative to overcome the problems of organic-based coatings has been the use of coatings which use inorganic binders. For example, U.S. Pat. No. 3,977,888 to Sano et al. describes preparing a colored inorganic coating material having excellent adherence, high crack resistance, fire resistance, weather resistance, and high gloss. The colored inorganic coating material is formed by applying an aqueous, viscous solution of an alkali silicate and pigments and/or fillers to a substrate, and applying a hardener to the inorganic coating material to harden the inorganic coating material. U.S. Pat. No. 5,164,003 to Bosco et al. describes a coating material for the protection of substrates from wear and corrosion which comprises a silica-based binder of an alkali metal silicate, silica gel, a crosslinking agent and water. Nevertheless, these inorganic-based materials do not possess the desired properties for transportation and sign surfaces such as retroreflectivity and flexibility and are therefore not fit for this purpose.

An additional concern in the application of coatings for marking transportation and sign surfaces is the accumulation of dirt on the surface markings. The accumulation of dirt causes a reduction in the visibility of the surface marking during daylight and the retroreflectivity of the surface marking at night. Unfortunately, however, conventional coatings generally attract dirt from the environment and ongoing traffic.

SUMMARY OF THE INVENTION

The present invention provides a coating composition for transportation and sign surfaces which overcomes the problems in the art. The coating composition of the invention has excellent bonding properties to substrates, good water repelling properties to minimize the reduction of visibility during wet weather conditions, and good retroreflectivity. Furthermore, the coatings of the invention are highly resistant to the accumulation of dirt on the marked surfaces. Therefore, the coatings remain visible under normal service conditions. The coating compositions of the invention also do not release VOC and are therefore environmentally desirable. The coating compositions of the invention can be easily applied to the surface of a substrate at various thicknesses. The coating compositions also polymerize and crosslink rapidly and therefore the no-pick-up time and tack-free time for these compositions is desirably quick.

The present invention includes a coating composition comprising a mixture of a hybrid inorganic-organic binder capable of being polymerized and crosslinked, a visibility enhancement filler, a retroreflectivity enhancement filler, and a moisture proofing and water repellent material. Preferably, the organic material in the binder is an acrylic resin and the inorganic material in the binder includes at least one inorganic compound selected from lithium polysilicate, sodium polysilicate, potassium polysilicate and silica gel. The coating composition can also include a microstructure enhancement chemical and various other additives including surfactants, defoamers, rheology modifiers and coalescing agents. The coating composition of the invention can be prepared by blending these components into a composition having a desired viscosity for application.

The present invention further includes a coated substrate comprising a substrate and a hardened coating bonded to at least a portion of a surface of the substrate. The coating comprises the reaction product of a hybrid binder comprising an organic material and an inorganic material, a visibility enhancement filler, a retroreflectivity enhancement filler, and a moisture proofing and water repellant material. The coating composition can be applied to substrates such as metal, ceramic, wood, stone, masonry, cementitious, and bituminous substrates.

The present invention further comprises a method of producing a coated substrate. A coating composition comprising a mixture of a binder capable of being polymerized and crosslinked and comprising an organic material and an inorganic material, a visibility enhancement filler, a retroreflectivity enhancement filler, and a moisture proofing and water repellent material, is applied to at least a portion of a surface of a substrate. The binder in the coating composition is then allowed to polymerize and crosslink to produce the coated substrate.

Other features and advantages of the present invention will be apparent from the following detailed description of the invention which illustrates, by way of example, the principles of the invention.

DETAILED DESCRIPTION OF THE INVENTION

The present invention will be described more fully hereinafter with reference to the preferred embodiments of the invention. This invention can, however, be embodied in many different forms and should not be construed as limited to the embodiments set forth herein; rather, these embodiments are provided so that this disclosure will be thorough and complete, and will fully convey the s cope of the invention to those skilled in the art.

As used herein, the term "transportation surfaces" includes but is not limited to road, runway and bridge structures for automobiles, airplanes and other vehicles. The term "sign surfaces ", as used herein, includes but is not limited to surfaces for structures such as signs, posts, barriers and other objects which are used to provide information to vehicle operators.

The present invention includes a coating composition which can be used in various applications and which has been found particularly useful in coating transportation and sign surfaces. The coating composition is a mixture of a binder capable of being polymerized and crosslinked and comprising an organic material and an inorganic material, a visibility enhancement filler, a retroreflectivity enhancement filler, a moisture proofing and water repellent material, and optionally at least one additive.

As mentioned above, the binder for use in the coating compositions of the invention is a hybrid organic and inorganic binder which is capable of being polymerized and crosslinked. Typically, the organic material in the binder is a high pH compatible acrylic resin such as UCAR® 123 from Union Carbide. Alternatively, a styrene-butadiene-acrylic emulsion can be used to augment or replace the acrylic resin especially for application to flexible substrates which have a tendency to flex or move, or to substrates where high impact is expected.

The inorganic material in the binder is preferably a metal polysilicate such as lithium polysilicate, sodium polysilicate or potassium polysilicate, a silica gel, or a mixture thereof. Preferably, the metal polysilicate is lithium polysilicate because of its high moisture resistance in the hardened product. The binder can be polymerized and crosslinked under the chemical action of other materials in the coating composition to form a hardened coating which adheres to the underlying surface and which provides enhanced mechanical strength and abrasion resistance.

The coating composition also includes visibility enhancement fillers which improve the visibility of the marking on the transportation and sign surfaces. Preferably, the coating compositions of the invention include several visibility enhancement fillers which have different effects on the coating composition to provide the desired visibility properties. In general, two types of visibility enhancement fillers can be used in the compositions. The first type of visibility enhancement filler is chemically inert in the coating composition. Typical examples include titanium dioxide, calcium carbonate, and fine silica flour. The second type of visibility enhancement filler is chemically reactive in the coating composition. Examples of the second filler type include calcined blue flint, calcined clays, and cristobalite. Cristobalite, which is a calcined blue flint, also increases the whiteness and hardness of the final product. Therefore, cristobalite can also be used to minimize the amount of titanium dioxide ($TiO_2$) pigment used in the coating composition and thus can reduce the cost of the composition.

The coating compositions of the invention also include retroreflectivity enhancement fillers which improve the retroreflectivity of the markings so that the markings can be easily seen at nighttime. Specifically, the retroreflectivity enhancement fillers reflect back light such as from headlights at night to allow the markings to be visible. Typically, more than one retroreflectivity enhancement filler is added to the coating composition to provide the desired retroreflective properties for the hardened coating. Exemplary retroreflectivity enhancement fillers include glass beads and flaked glass. For example, A-glass (soda-lime) or E-glass (borosilicate) beads can be added to the coating composition. The glass beads and flaked glass can be added in an amount up to 60% by weight of the total coating composition. The retroreflectivity of the retroreflectivity enhancement filler is improved over time due to natural wear. Specifically, as the binder and pigments wear during normal use, more of the glass beads and flaked glass becomes exposed thus increasing the retroreflectivity of the marking.

Moisture proof and water repellent materials are further included in the coating compositions of the invention. These materials aid in the visibility of the markings on transportation and sign surfaces under inclement conditions (e.g. rain and snow) by keeping water from wetting the marking. Typical examples of moisture proofing and water repellent materials for use in the invention include calcium oleate, aluminum stearate, sodium methyl siliconate, potassium methyl siliconate, and salts of long carbon chain fatty acids (i.e., having a carbon chain of C10 or greater). In addition, the organosiliconates (sodium methyl siliconate and potassium methyl siliconate) help to stabilize the alkali metal silicates used in the binder. Adding even a small amount of an organosiliconate compound to the coating composition stabilizes the alkali metal silicate and thereby prevents the coating composition from cracking or curling.

The coating composition of the invention can also include microstructure enhancement chemicals. The microstructure enhancement chemicals function to modify the microstructure of binder matrix to provide strong adhesion to the surface of a substrate when the coating composition is applied thereto. The microstructure enhancement chemicals also help to maximize the performance and durability of the hardened coating. Typical examples of microstructure enhancement chemicals for use in the invention include organofunctional silanes. Additionally, a coupling agent can be applied to the retroreflectivity enhancement fillers to increase their adhesion to the binder in the coating composition.

In addition to the above mentioned components, the coating compositions of the invention can further include one or more additives to improve certain properties in the coating composition during handling and application, or to improve properties in the hardened coating. One exemplary group of additives are surfactants which help to disperse the fillers in the system. Typical examples of surfactants for use in the invention include polyoxyethylene alcohols, ethoxylated nonphenols, dialkylphenol ethoxylates, polyoxyethylene sorbitan monooleate, polyoxyethylene monooleate, and tridecyl ether polyoxyethylene. One suitable surfactant for use in the invention is an ethoxylated octylphenol.

Defoamers can also be added to the coating compositions of the invention to ensure uniform application of the product onto the substrate without entraining air in the markings. As will be understood by those skilled in the art, the entrainment of air in the coating compositions inhibits adhesion of the coating composition to the underlying surface and can therefore limit the durability of the coating. The defoamer is preferably a silicon defoamer such as Dow Corning® 65. The amount of defoamer added to the coating composition is preferably between 0.01% and 3% by weight. Any amount higher than 3% is typically detrimental to the adhesion of the coating to the substrate.

The coating composition can further include rheology modifiers which alter the viscosity of the coating composition. Because it is important that the coating composition has a certain viscosity when applied to a substrate surface, rheology modifiers are used in the system to ensure the stability of the formulation and to achieve the desired viscosity. Typical rheology modifiers include water-soluble cellulose ethers (e.g. hydroxymethyl cellulose) and certain minerals such as colloidal clays (e.g. bentonite). In addition, rheology modifiers can also be added which not only modify viscosity but also contribute to the curing of the binder. For example, a highly reactive metakaolin such as Metamax™ from Engelhard Corp. which reacts with polysilicates in the binder can be added to increase the viscosity of the coating composition.

The coating compositions of the invention can further include a coalescing agent. The coalescing agent promotes crosslinking of the reactive binder in the coating composition and therefore enhances the strength and other properties of the coating. One suitable coalescing agent for use in the invention is a propylene glycol butyl ether solvent. This coalescing agent also aids in forming a fast tack-free and track-free continuous film. In addition, the coalescing agent can improve the uniform dispersion of the pigments in the coating composition.

Crosslinking agents such as a modified diphenylmethane diisocyanate (MDI) can also be added to promote crosslinking of the acrylic resin. An amino functional polysiloxane can also be hydrolyzed into the alkali metal polysilicate solution prior to adding the polysilicate to the coating composition to promote bonding between the organic and inorganic materials in the binder.

In addition to the above additives, coloring pigments can be added to the system to change the color of the materials. For example, a yellow pigment or pigments, can be added to make a yellow product which can be used for the division of median marking lanes of roads to guide the movement of vehicles. In addition a pigment extender, such as anhydrous aluminum silicate, can be added to reduce the amount of $TiO_2$ needed in the composition and thus reduce the cost of the coating composition. Depending on the application, the pigments can be ground at high speeds to produce no gloss or sheen, or can be ball milled, sand milled, or pebble milled to a particle size finer than a standard reference called hegman grind #6, if gloss or sheen is preferred.

In addition to standard pigments, fluorescent pigments or phosphorescent pigments can be added to the coating compositions. These fluorescent pigments bring unique glow-in-the-dark properties to the marking lines during darkness. Typical examples of such glow-in-the-dark materials are afterglow pigments based on zinc sulfide sold under the trademark Lumilux® and available from Riedel-de-Haën. Other suitable afterglow pigments for use in the invention include cadmium sulfide, cadmium selenide, strontium sulfide, and/or copper doped chemicals. Phosphor based pigments are also suitable, but less preferred since the afterglow is not as bright.

In addition to the above, monocyclic or bicyclic oxazolidines can be added to the coating composition to protect the coating against microbial deterioration.

The coating compositions of the invention can be easily prepared by blending the desired components. The order and method of addition can vary depending on the binder components and non-binder components used in the coating composition. For example, the components can be mixed using a high speed mixer or disperser under constant agitation. Typically, the non-binder components of the coating composition are mixed together and then the binder material is added. Alternatively, the binder and a pigment grind can be prepared separately and then blended together to form the coating composition. If any of the non-binder material is difficult to disperse, this material can also be blended with the binder during the formation of the binder. The coating composition of the invention can also be produced by preparing a dry mix formulation containing all of the components in a dry form, mixing the components in a dry powder blending machine such as a ribbon blender, adding water to the components and mixing the components at high speed to form the coating composition.

A coated substrate can be produced using the coating compositions of the invention. Preferably, the coating composition is prepared as described above and then applied to at least a portion of a surface of a substrate using brush, roller, trowel, or spray equipment. Typical substrates include metal, ceramic, wood, stone, masonry, cementitious, and bituminous substrates. For example, the coating composition can be applied to the surface of a road or runway or to a sign. The coating composition is then allowed to polymerize and crosslink to produce a coated substrate.

The resulting coated substrate comprises a substrate and a hardened coating bonded to at least a portion of a surface of the substrate. The hardened coating comprises the reaction product of the hybrid binder comprising an organic material and an inorganic material, the visibility enhancement filler, the retroreflectivity enhancement filler, and the moisture proofing and water repellant material. As will be understood by one skilled in the art, generally not all of the components actually react to form the reaction product. Nevertheless, even the non-reactive components are present in the reaction product.

Advantageously, the binder hardens or cures quickly as soon as the product is applied to the transportation or sign surface. The coating composition therefore has a quick tack-free, track-free or no-pick-up time such that quickly after the application of the coating composition, the coating composition does not adhere to an object rolling over the coated surface. In particular, the no-pick-up time for the coating compositions of the invention can be in the order of from ten minutes to two or three hours, compared to several hours for conventional coating formulations. This rate of drying makes this invention very favorable for transportation and sign surfaces especially considering that roads and runways are closed during the application of these caoting compositions.

The present invention will now be further described by the following non-limiting examples.

EXAMPLE 1

In a plastic container, 70.0 grams of water is added and subjected to mixing under constant agitation using a high speed disperser. Then, 1.0 grams of an ethoxylated octylphenol surfactant is added. While the water and the surfactant is being mixed, 11.50 grams of a propylene glycol butyl ether coalescing agent is added. A small amount, 1.50 grams, of a hydroxy methyl cellulose rheology modifier is also added to modify the viscosity of the mixture. During the mixing process, 2.0 grams of sodium methyl siliconate or potassium methyl siliconate is added. Then, 1.5 grams of a silicon defoamer is also added to limit the production of foam during the addition of the organosiliconates.

After the addition of the above components, 10.0 grams of cristobalite is added as a visibility enhancement filler. While constant agitation of the mixture is taking place at about 800 rpm, 20 grams of highly reactive metakaolin (Metamax™ from Engelhard Corp.) is also added and increases the viscosity of the mixture. After the metakaolin is added, the mixture is agitated for 10 minutes under high speed (about 1000–1500 rpm). A pigment grind is then prepared and added to the container during agitation. The pigment grind includes 50.0 grams of $TiO_2$ and 10.0 grams an anhydrous aluminum silicate pigment extender mixed together. The mixture is continuously agitated for 20 minutes after the pigment grind is added until it achieves a uniform smooth paste.

Next, the inorganic material of the binder is slowly added to the container under continued mixing. Specifically, 175.0 grams of lithium polysilicate solution available from FMC Corporation, Lithium Division, under the name LifeTech™ 705 is added. The lithium polysilicate is mixed only for about 1–2 minutes until a uniform and smooth mixture is obtained. Directly thereafter, 75.0 grams of an alkaline resistant acrylic resin emulsion is added to the mix. The acrylic resin emulsion added to the mixture is DT-100 NA available from Dow Chemicals and is stabilized at a pH level of 9 and has a solids content by weight of 60–65%.

The mixture is then agitated using the high speed disperser for five minutes to produce a smooth, uniform product. Thereafter, 170 grams of A-glass or E-glass solid glass beads are added for retroreflectivity of the coating. The size distribution of the beads is in the range of 35–300 microns. In addition, a coupling agent is present on the glass bead surface in molecular layers to obtain maximum interfacial bonding between the glass spheres and the binder matrix. The coating composition is adjusted to the desired viscosity level by adding small amounts of water until a proper viscosity is reached.

The resulting coating composition is then brushed onto the surface of a cementitious substrate using a paintbrush. The coating composition has a very fast tack/track free time. The estimated application rate with the paintbrush is 7.5 linear feet per minute and the tack, as well as track free, time is about 20 seconds.

EXAMPLE 2

A coating composition is prepared in the same manner as in Example 1 except for the addition of 15.0 grams of a modified diphenylmethane diisocyanate (MDI).

EXAMPLE 3

A coating composition is prepared in the same manner as in Example 1 except for the addition of 15.0 grams of a monocyclic or bicyclic oxazolidine to add antimicrobial preservative properties to the composition.

EXAMPLE 4

A coating composition is prepared in the same manner as in Example 1 except that an amino functional polysiloxane is hydrolyzed into the alkali metal polysilicate solution prior to the addition into the rest of the mixture. As a result, there is greater chemical interaction between the organic and inorganic materials in the coating composition.

EXAMPLE 5

In a plastic container, 135.0 grams of tap water is added. Under constant mixing at about 700–800 rpm with a high speed dispenser, 2.0 grams of an ethoxylated octylphenol surfactant is then added. Two hundred fifty-five (255.0) grams of titanium dioxide ($TiO_2$) available under the trade name Titox Rutile R-960 from DuPont is then added. Directly thereafter, 23.0 grams of propylene glycol butyl ether coalescent solvent and 3.0 grams of hydroxymethyl cellulose are sequentially added under high speed. In addition, 3.0 grams of the Dow Corning® 65 defoamer described above is added. The resulting mixture is subsequently high speed dispersed for about five minutes to form the pigment grind.

In another plastic container, using a separate high speed mixer, the binder is prepared. First, 350.0 grams of a lithium polysilicate solution (Lifetech™ 705) is added to the container and the mixer set at 600 rpm. In yet another container, 4.0 grams of sodium methyl siliconate or potassium methyl siliconate is dispersed in equal amounts of water. The siliconate and water dispersion is added to the lithium polysilicate solution slowly during constant mixing. Directly thereafter, 450 grams of finely ground silica (silica flour) of a maximum particle size of 200 mesh is added to the mixture along with 5.0 grams of amorphous fumed silica (Aerosil 200 available from Degussa Corporation) for viscosity control. Then, 150.0 grams of an alkali stable acrylic emulsion available from Dow Chemicals under the trade name DT 100 NA™ is added and high speed mixed for about 5–7 minutes. The pigment grind is then added slowly under constant agitation. Once the pigment grind is added, agitation is continued for another 4–5 minutes to ensure a smooth and homogeneous matrix.

The resulting mixture demonstrates a fast tack free time in thin applications.

EXAMPLE 6

A coating composition is prepared in the same manner as in Example 5 except that instead of adding an acrylic emulsion, a high pH compatible, high impact resistant styrene-butadiene-acrylic emulsion is added to the inorganic binder material. Extreme caution is taken when adding the resin emulsion to the silicate solution so that no coagulation takes place due to pH shock. Specifically, small amounts of the styrene-butadiene-acrylic emulsion are added under high speed and high shear until 150.0 grams are dispersed into the silicate solution. The resulting coating composition is especially suitable for application to flexible substrates which have a tendency to flex or move, or to substrates where high impact is expected.

EXAMPLE 7

A coating composition is prepared in the same manner as in Example 5 except that a crushed, shaped and sized recycled C-R-T glass from television tubes, computer screens, and panel glass is added as a filler. Specifically, 45% by weight of the coating composition includes this filler and produces a coating composition having a very good consistency. The particle sizes of the C-R-T glass range from 200 sieve size to 35 sieve size and the load distribution of the glass particles is as follows:

| 40% B.W. | 35 Sieve ("500 μm) |
| 10% B.W. | 60 Sieve ("250 μm) |
| 10% B.W. | 80–100 Sieve ("177–149 μm) |
| 20% B.W. | 100–140 Sieve ("177–105 μm) |
| 20% B.W. | 140–200 Sieve ("105–75 μm) |

The C-R-T glass filler additive increases the wear resistance of the coating and enhances the retroreflective properties of the coating.

EXAMPLE 8

This example will describe how to prepare a coating composition that has a long afterglow at night for better visibility. In a plastic container, 11.50 grams of propylene glycol butyl ether and 1.00 gram of an ethoxylated octylphenol surfactant are added under constant mixing using a high speed mixer. The mixture is allowed to blend for about one minute. Two (2.0) grams of potassium methyl siliconate is then added followed by 1.50 grams of hydroxymethyl cellulose, and 1.50 grams of silicone based defoamer, to form the pigment grind.

In the preparation of the binder, 175.0 grams of lithium polysilicate (Lifetech™ 705 from FMC Corporation) is added to a suitable container under constant agitation using a high speed mixer. The Dow Chemical DT 100 NA™ acrylic emulsion in an amount of 75.00 grams is then added to the binder. The mixture is allowed to blend for another 3–4 minutes under high speed (1200–1400 rpm). The speed of the mixer is decreased to 600–700 rpm and the pigment grind is added at low shear. It is important that the pigments are not exposed to high shear because a reduction in the size of the pigment particles could cause a dramatic reduction in the glowing characteristics of the afterglow pigment. During the low shear mixing of the mixture, 67.00 grams of a copper doped zinc sulfide is added to the mixture. The mixture is then mixed for an additional 1–2 minutes.

The afterglow coating formulation can be applied on top of an existing painted surface to give the appearance of being one color in daylight and another in darkness. It can also be modified to any color that is necessary. The afterglow of the coating can be seen for 8–10 hours after darkness.

EXAMPLE 9

The following components were added to a suitable container and mixed using a high speed mixer:
- 300.00 g of Lifetech™ 705 (lithium polysilicate from FMC Corp.)
- 400.00 g of Silco-Sil #52 (a silica flour from U.S. Silica)
- 75.00 g of Nyacol 300 (a pigment filler/extender from PQ Corp.)

To this mixture, during high speed agitation, was added the following:
- 60.00 g of Rhoplex® 1018 (an acrylic emulsion from Rohm and Haas Co.)
- 60.00 g of Ucar® 123
- 200.00 g of Sodium Silicate "N" from PQ Corporation
- 40.00 g of Dow Corning® 777 (a potassium methyl siliconate)
- 10.00 g of Dow Corning® 57 (a silicon defoamer)
- 10.00 g of Nopcosperse 44 (a surfactant from Henkel Corp.)
- 120.00 g of TiO$_2$ (Titox Rutile R-706 from Dupont)

The resulting coating composition was applied to a concrete substrate and tested, the results are provided in Table 1.

EXAMPLE 10

The following components were added to a suitable container and mixed using a high speed mixer:
- 300.00 g of Lifetech™ 705
- 100.00 g of Silco-Sil #52
- 100.00 g of Nyacol 300

To this mixture, during high speed agitation, was added the following:
- 120.00 g of Ucar 123
- 200.00 g of Sodium Silicate "N"
- 30.00 g of Dow Corning® 777
- 10.00 g of Dow Corning® 57
- 10.00 g of Nopcosperse 44
- 140.00 g of TiO$_2$ (Titox Rutile R-706 from DuPont)

The resulting coating composition was applied to a concrete substrate and tested, the results are provided in Table 1.

TABLE 1

| Product and Performance Information | Example 9 | Example 10 |
|---|---|---|
| Specific Gravity | 1.67 | 1.65 |
| Total Solids (wt %) | 65.00 | 57.02 |
| Total Solids (vol %) | 48.18 | 36.17 |
| Pigment (%) | 46.66 | 33.66 |
| Viscosity (CPS at 75° F.) | 413 | 444 |
| Viscosity after formulation (CPS at 75° F.) | 415 | 448 |
| Track Time (71° F.) ASTM Method D-711: | | |
| No-pick-up time at 15 mil thickness (wet) | 1.47 | 3.33 |
| No-pick-up time at 25 mil thickness (wet) | 5.11 | 7.21 |
| Drying Time (mins) ASTM Method D-1640 | 7.10 | 9.14 |
| Water Resistance ASTM Method D-870 | | |
| Blistering | Pass | Pass |
| Loss of Adhesion | Pass | Pass |
| Discoloration | Pass | Pass |
| Solvent Resistance ASTM Method D-2792 | | |
| Gasoline Resistance | Pass | Pass |
| Motor Oil Resistance | Pass | Pass |
| Pull-Off Adhesion ASTM Method D-3559 | | |
| Concrete, Thickness (wet) 15 mil | 850 | 900 |
| | 635 | 475 |
| Abrasion Resistance ASTM Method D-4060 (thickness (wet) 15 mil; curing 24 hrs. air dry, load 1000 g, and cycles 1000) | | |
| Without Beads: Weight Loss (mg) | 80 | 76 |
| Without Beads: Wear Index | 80 | 76 |
| With Beads: Weight Loss (mg) | 119 | 117 |
| With Beads: Wear Index | 119 | 117 |
| Opacity (15 mil wet) | 10 | 10 |
| Flexibility ASTM Method D-522 | ¼" | ¼" |
| Fineness of Grind | 5–6 | 5–6 |

EXAMPLE 11

The following components were added to a suitable container and mixed using a high speed mixer:
- 300.00 g of Lifetech™ 705
- 350.00 g of Minspar 4 (a feldspar from KT Feldspar Corp.)
- 75.00 g of Nyacol 300

To this mixture, during high speed agitation, was added the following:
- 60.00 g of Acronal 296D (an acrylic from Rohm and Haas)
- 60.00 g of Ucar 123

200.00 g of Sodium Silicate "N"

30.00 g of Dow Corning® 772 (a sodium methyl siliconate)

10.00 g of Dow Corning® 57

10.00 g of Nopcosperse 44

65.00 g of Yellow-T/1222 pigment (from Davis Color)

The coating composition was applied to a cementitious surface and exposed to wind, weather and traffic for approximately one month. The retroreflectivity of the coating was measured by a Mirrolux instrument and is included in Table 2.

EXAMPLE 12

The following components were added to a suitable container and mixed using a high speed mixer:

300.00 g of Lifetech™ 705

350.00 g of Minspar 4

75.00 g of Nyacol 300

To this mixture, during high speed agitation, was added the following:

60.00 g of BASF 296D (an acrylic emulsion)

60.00 g of Ucar 123

200.00 g of Sodium Silicate "N"

30.00 g of Dow Corning® 777

10.00 g of Dow Corning® 57

3.00 g of Nopcosperse 44

120.00 g of $TiO_2$ (Titox Rutile R-706 from DuPont)

The coating composition was applied to a cementitious surface and exposed to wind, weather and traffic for approximately one month. The retroreflectivity of the coating was measured by a Mirrolux instrument and is included in Table 2.

EXAMPLE 13

The following components were added to a suitable container and mixed using a high speed mixer:

300.00 g of Lifetech™ 705

425.00 g of Minspar 4

To this mixture, during high speed agitation, was added the following:

60.00 g of Acronal 296D 60.00 g of Ucar 123

200.00 g of Sodium Silicate "N"

30.00 g of Dow Corning® 777

10.00 g of Dow Corning® 57

10.00 g of Nopcosperse 44

120.00 g of $TiO_2$ (Titox Rutile R-706 from DuPont)

The coating composition was applied to a cementitious surface and exposed to wind, weather and traffic for approximately one month. The retroreflectivity of the coating was measured by a Mirrolux instrument and is included in Table 2.

TABLE 2

| Coating Composition: | Retroreflectivity |
|---|---|
| Example 11 | 331 |
| Example 12 | 325 |
| Example 13 | 358 |

EXAMPLE 14

A modified formula was tested as a control for rheology modification by taking out the cellulose thickener. The following components were added to a plastic container and mixed using a high speed mixer:

70.00 g of $H_2O$ 1.00 g of N-101 surfactant 11.50 g of DB-Solv (a crosslinking agent from Union Carbide)

15.00 g of Metamax EF (a metakaolin from Engelhard Corp.)

2.00 g of Dow Corning® 777

1.50 g of Dow Corning® 65 (a silicon defoamer)

15.00 g of cristobalite #200

5.00 g of Optiwhite MX (a clay filler pigment extender from Burgess Co.)

50.00 g of $TiO_2$ (Titox Rutile R-960 from Dupont)

175.00 g of Lifetech™ 705

75.00 g of DT-100 NA™ (an acrylic emulsion from Dow Chemicals)

Certain parameters were measured for this coating composition and are provided in Table 3.

TABLE 3

| Product and Performance Information | Example 14 |
|---|---|
| Specific Gravity | 1.35 |
| Total Solids (vol %) | 44.5 |
| Bead Content (%) | 18.64 |
| Bead Gradation | 50:50 of 120/170 and 40/50 mesh |
| Viscosity after formulation (centistokes using EZ-Cup #4 at 500–2300) | 500 |
| Drying time after application ASTM Method D-711: | 22 sec (6 mil) 71 sec (15 mil) |
| Water Resistance ASTM Method D-870 | |
| Blistering | Pass |
| Loss of Adhesion | Pass |
| Discoloration | Pass |
| Solvent Resistance ASTM Method D-2792 | |
| Gasoline Resistance | Pass |
| Motor Oil Resistance | Pass |
| Pull-Off Adhesion (psi) ASTM Method D-4541 | |
| Concrete, Thickness (wet) 5 mil | 600 |
| Concrete, Thickness (wet) 10 mil | 375 |
| Asphalt, Thickness (wet) 10 mil | 225 |
| Abrasion Resistance ASTM Method D-4060 For Example 15: thickness (wet) 10 mil; curing 24 hrs. air dry, wheel #CS-10, load 1000 g, and 1500 cycles | |
| Weight Loss (mg) | 42 |
| Wear Index | 28 |

While particular embodiments of the invention have been described, it will be understood, of course, the invention is not limited thereto since modifications can be made by those skilled in the art, particularly in light of the foregoing teachings. The appended claims are contemplated to cover any such modifications that incorporate the features of these improvements in the true spirit and scope of the invention.

That which is claimed:

1. A coating composition comprising a mixture of:

a hybrid binder capable of being polymerized and crosslinked and comprising an organic material and an inorganic material;

a visibility enhancement filler;

a retroreflectivity enhancement filler; and a moisture proofing and water repellent material.

2. The composition of claim 1 wherein the inorganic material in said binder includes at least one inorganic compound selected from lithium polysilicate, sodium polysilicate, potassium polysilicate and silica gel.

3. The composition of claim 1 wherein the organic material is said binder is an acrylic resin.

4. The composition of claim 1 wherein the visibility enhancement filler is selected from titanium dioxide, calcium carbonate, silica flour, calcined blue flint, calcined clays and cristobalite.

5. The composition of claim 1 wherein the retroreflectivity enhancement filler is selected from glass beads and flaked glass.

6. The composition of claim 1 wherein the moisture proofing and water repellant material is selected from salts of fatty acids having carbon chains of at least 10, sodium methyl siliconate and potassium methyl siliconate.

7. The composition of claim 6 wherein the salt of a long carbon chain fatty acid is selected from calcium oleate and aluminum stearate.

8. The composition of claim 1 further comprising a microstructure enhancement chemical.

9. The composition of claim 8 wherein the microstructure enhancement chemical is an organofunctional silane.

10. The composition of claim 1 further comprising at least one additive selected from surfactants, defoamers, rheology modifiers and coalescing agents.

11. The composition of claim 10 wherein the surfactant is selected from ethoxylated octylphenols, polyoxyethylene alcohols, ethoxylated nonphenols, dialkylphenol ethoxylates, polyoxyethylene sorbitan monooleate, polyoxyethylene monooleate and tridecyl ether polyoxyethylene.

12. The composition of claim 10 wherein the defoamer is a silicon defoamer.

13. The composition of claim 10 wherein the rheology modifier is selected from water soluble cellulose ethers and colloidal clays.

14. The composition of claim 10 wherein the rheology modifier is hydroxymethyl cellulose or sodium bentonite.

15. The composition of claim 10 wherein the coalescing agent is propylene glycol butyl ether.

16. A coated substrate comprising:

a substrate; and a hardened coating bonded to at least a portion of a surface of said substrate, said coating comprising the reaction product of a hybrid binder comprising an organic material and an inorganic material, a visibility enhancement filler, a retroreflectivity enhancement filler, and a moisture proofing and water repellant material.

17. The coated substrate of claim 16 wherein said substrate is selected from metal, ceramic, wood, stone, masonry, cementitious, and bituminous substrates.

18. A method of preparing a coating composition comprising the step of blending a binder capable of being polymerized and crosslinked and comprising an organic material and an inorganic material, a visibility enhancement filler, a retroreflectivity enhancement filler, and a moisture proofing and water repellent material.

19. A method of producing a coated substrate comprising the steps of:

applying a coating composition to at least a portion of a surface of a substrate, said coating composition comprising a mixture of a binder capable of being polymerized and crosslinked and comprising an organic material and an inorganic material, a visibility enhancement filler, a retroreflectivity enhancement filler, and a moisture proofing and water repellent material; and allowing the coating composition to polymerize and crosslink to produce a coated substrate.

20. The method according to claim 19 wherein said applying step comprises applying the coating composition using brush, roller, trowel, or spray equipment.

21. The method according to claim 19 wherein said applying step comprises applying the coating composition to the surface of a substrate selected from metal, ceramic, wood, stone, masonry, cementitious, and bituminous substrates.

22. The method according to claim 19 wherein said applying step comprises applying the coating composition to a surface of a road or runway.

23. The method according to claim 19 wherein said applying step comprises applying the coating composition to a surface of a sign.

* * * * *